United States Patent
Hung et al.

(10) Patent No.: US 7,506,150 B2
(45) Date of Patent: Mar. 17, 2009

(54) COMPUTER SYSTEM AND RELATED METHOD OF PLAYING AUDIO FILES WHEN BOOTING

(75) Inventors: Tsung-Fu Hung, Taipei (TW); Hsu-Huang Cheng, Taipei (TW); Tsorng-Yang Mei, Taipei (TW)

(73) Assignee: ASMedia Technology Inc., Taipei Hsien (TW)

( * ) Notice: Subject to any disclaimer, the term of this patent is extended or adjusted under 35 U.S.C. 154(b) by 17 days.

(21) Appl. No.: 11/307,739

(22) Filed: Feb. 20, 2006

(65) Prior Publication Data
US 2006/0236081 A1      Oct. 19, 2006

(30) Foreign Application Priority Data
Apr. 18, 2005     (TW)     .............................. 94112253 A

(51) Int. Cl.
*G10H 1/18*      (2006.01)
(52) U.S. Cl. ................. 713/2; 84/601; 84/602
(58) Field of Classification Search ........... 84/600–602; 713/2
See application file for complete search history.

(56) References Cited

U.S. PATENT DOCUMENTS

| | | | |
|---|---|---|---|
| 6,401,202 B1 * | 6/2002 | Abgrall | 713/2 |
| 6,791,572 B1 * | 9/2004 | Cloney et al. | 345/619 |
| 7,082,526 B2 * | 7/2006 | Chang | 713/2 |
| 2002/0062437 A1 | 5/2002 | Shin et al. | |
| 2003/0122864 A1 | 7/2003 | Jenne et al. | |
| 2003/0221093 A1 * | 11/2003 | Touchet | 713/1 |
| 2004/0039904 A1 | 2/2004 | Lin et al. | |
| 2004/0093490 A1 * | 5/2004 | Lo | 713/2 |
| 2004/0107016 A1 | 6/2004 | Geeng | |
| 2004/0130557 A1 * | 7/2004 | Lin et al. | 345/619 |
| 2005/0172789 A1 * | 8/2005 | Hsu et al. | 84/645 |

FOREIGN PATENT DOCUMENTS

| | | |
|---|---|---|
| CN | 1424650 A | 6/2003 |
| CN | 1567135 A | 1/2005 |
| EP | 1 435 571 A1 | 7/2004 |
| TW | 554265 | 9/2003 |
| TW | 200407788 | 5/2004 |

* cited by examiner

*Primary Examiner*—Walter Benson
*Assistant Examiner*—David S. Warren
(74) *Attorney, Agent, or Firm*—Winston Hsu

(57) ABSTRACT

A computer system and related method for playing audio signals when booting the computer system. The computer system includes an audio circuit for playing an audio file when booting and a memory embedded in the audio circuit or externally coupled to the audio circuit for storing the audio file. It is realized by utilizing hardware and by executing software to overcome silence during booting, and to provide more selection and enjoyment for a user during booting.

7 Claims, 3 Drawing Sheets

US 7,506,150 B2

COMPUTER SYSTEM AND RELATED METHOD OF PLAYING AUDIO FILES WHEN BOOTING

BACKGROUND OF THE INVENTION

1. Field of the Invention

The present invention relates to a computer system and related method of playing audio file when booting, more particularly, to a computer system and related method of utilizing hardware for playing audio file and utilizing an audio playing program stored in basic input and output system (BIOS) to control a central processing unit to play an audio file when booting.

2. Description of the Prior Art

A computer is a tool that is commonly utilized at home or in the office. Each time the computer is switched on; a user needs to spend several minutes waiting for a boot sequence to complete. In general, when the computer is booted, the monitor will display related hardware information of computer system, for example, speed and model of central processing unit, size of dynamic random access memory (DRAM), information about peripheral drive electronics, and information about integrated drive electronics (IDE) device. Most users do not need this information to be displayed for them. Furthermore, no multi-media effects, only silence, are offered to the users as they continue to wait during the booting process.

SUMMARY OF THE INVENTION

The main objective of the claimed invention provides a computer system and related method to play audio files when the computer system is booted and to overcome the above-mentioned problem.

One embodiment of the claimed invention is a computer system capable of playing an audio file when booting. The computer system comprises an audio circuit for playing an audio file when the computer system is booting; and a memory, embedded in the audio circuit or coupled to the audio circuit selectively, for storing the audio file.

In another embodiment, the computer system comprises a sound device, a central processing unit (CPU) and a basic input and output system (BIOS). The CPU is coupled to the sound device for processing data. The BIOS is coupled to the central processing unit for storing an audio executing program and an audio file while the computer system is booting. The audio executing program requests the central processing unit to drive the sound device to play the audio file.

Another aspect of the claimed invention is a method of playing audio files when booting the computer system. In one embodiment, when the computer system executes a BIOS, an audio executing program is executed to request central processing unit of the computer system to drive a sound device and finally to output an audio file. The audio executing program and the audio file are stored in the BIOS. Therefore, the claimed invention effectively overcomes the defects and boringness of the prior art not being able to provide sound (such as audio) information and enjoyment to the user during the boot process.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
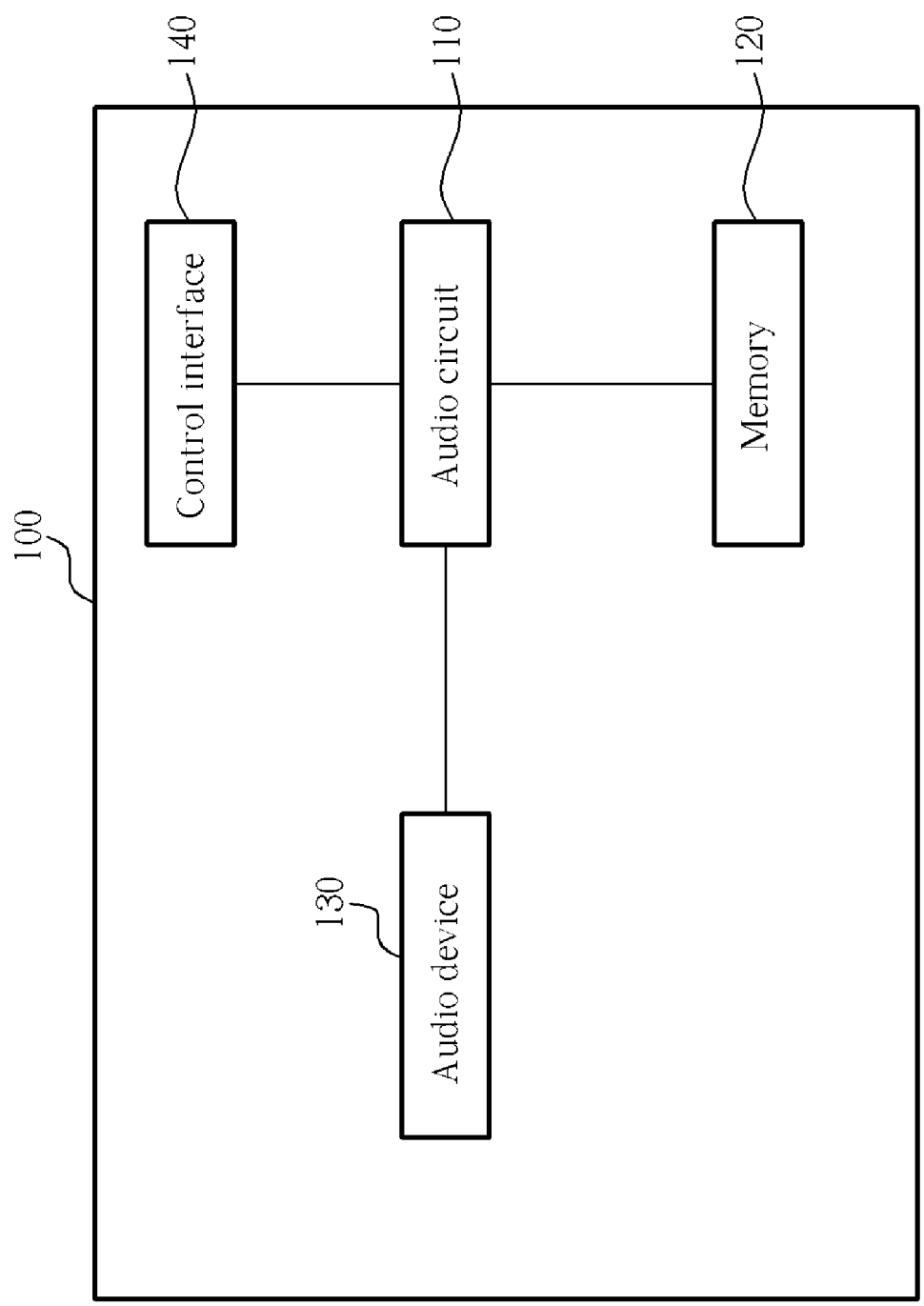
FIG. 1 illustrates a diagram of a computer system according to the first embodiment of the present invention.

Please refer to FIG. 1. FIG. 1 illustrates a diagram of a computer system 100 according to the first embodiment of the present invention. When the computer system 100 is booted, an audio circuit 110 is utilized for playing audio by extracting an audio file from a memory 120 through an audio device 130. The audio circuit 110 may be a digital signal processor (DSP) or an application specific integrated circuit (ASIC), which can be utilized immediately without having to wait for booting to complete. The memory 120 can be a memory that stores audio file for playing when the computer is booted, and can be a basic input and output system (BIOS). In short, the memory has to be initialized first when the computer is booted. When the memory has completely initialized while the computer system 100 is still booting, the audio circuit 110 is able to play audio by extracting an audio file from a memory 120 (the audio file comprises at least a music file). The audio device 130 can be external or built-in speakers, a pair of earphones, or other types of audio systems. The computer system 100 further comprises a control interface 140 for receiving commands in selecting audio files and adjusting the method of playing audio files. For example, the memory 120 is capable of storing a plurality of audio files, and the control interface 140 is capable of receiving command inputted by a user to play the selected audio file when the computer is being booted. Another example is when the audio circuit 110 has a function of controlling volume of the audio file played, the control controller 140 is also capable of receiving command inputted by the user to control the volume. Similarly, if the control interface 140 is required to receive a command before it is able to play the audio file, the control interface 140 can only receive commands after it has completed its initialization during the boot sequence. Hence, the design of the boot sequence of the computer system 100 is required to place a priority to perform and complete the initialization of the control interface 140.

Figure 2:
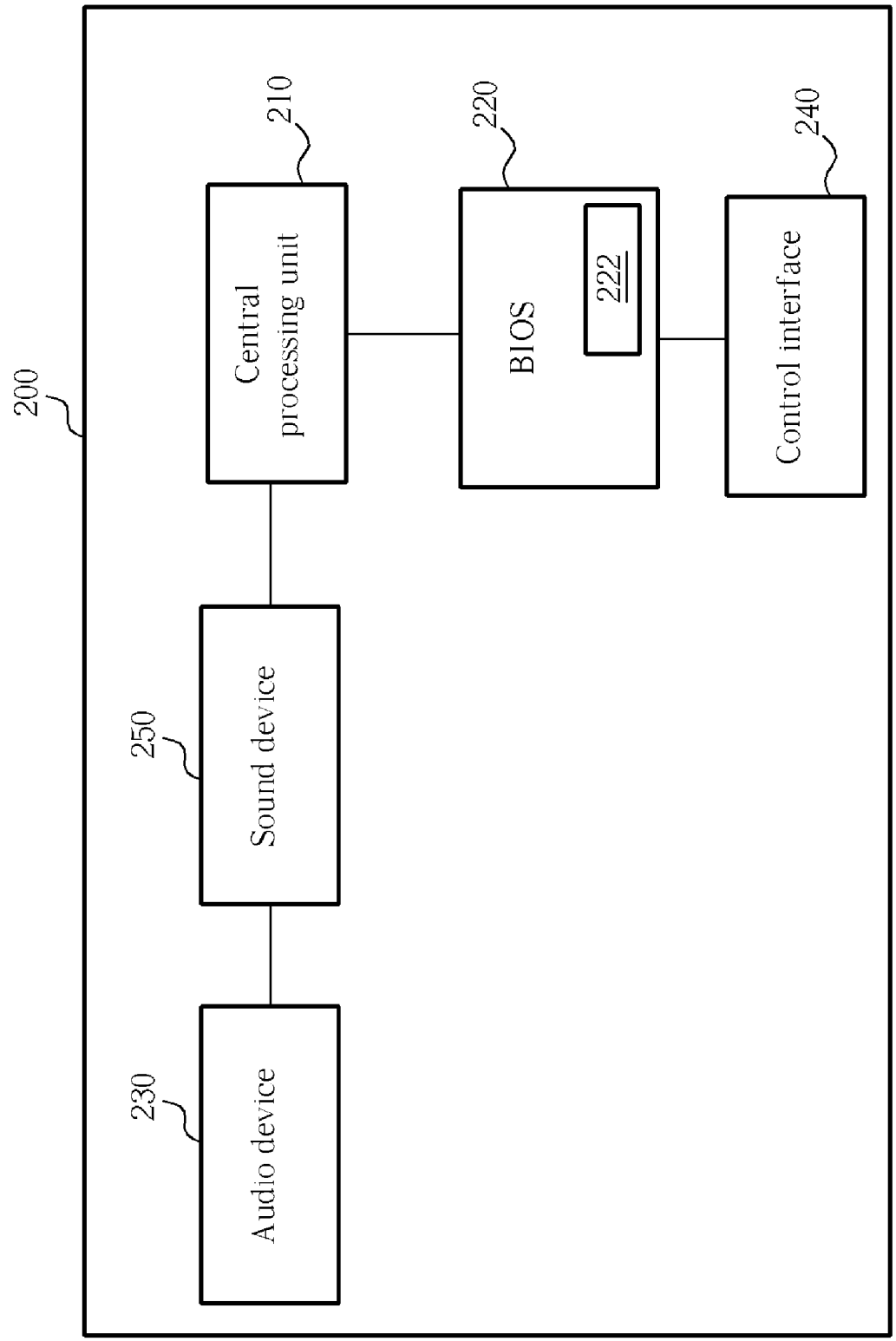
FIG. 2 illustrates a diagram of a computer system according to the second embodiment of the present invention.

The computer system is also capable of utilizing hardware to play audio files when the computer system is booted. The hardware are also capable of executing an audio executing program, during the boot sequence, to request the central processing unit to drive the sound device to play an audio file. Utilization of software can also realize the objective of the present invention. Please refer to FIG. 2. FIG. 2 illustrates a diagram of a computer system 200 according to the second embodiment of the present invention. An audio executing program 222 is stored in a basic input and output system (BIOS) 220 of the computer system 200. When the computer system 200 is executing the BIOS 220 during boot sequence, the audio executing program 225 can request a central processing unit 210 to drive a sound device 250 to play an audio file. The audio file is stored in the BIOS 220 through an external or an internal audio device 230; the audio executing program 222 continues to be executed during the completion of the boot sequence. In comparison to an audio circuit 110 of the computer system 100 of the first embodiment in FIG. 1, the hardware of the computer system 200 of FIG. 2 comprises the central processing unit 210, the BIOS 220, and the sound device 250 which are parts of the conventional computer system.

The computer system 200 can also include a control interface 240 for receiving commands in selecting an audio file and receiving commands in adjusting the method of playing audio files. For example, the BIOS 220 stores a plurality of audio files; the control interface 240 can be designed to receive commands from the user to play the selected audio file during the boot sequence. Another example, if the audio executing program 222, stored in the BIOS 220, has the function of controlling the volume of playing the audio file, the control interface 240 receives commands in controlling the volume.

Figure 3:
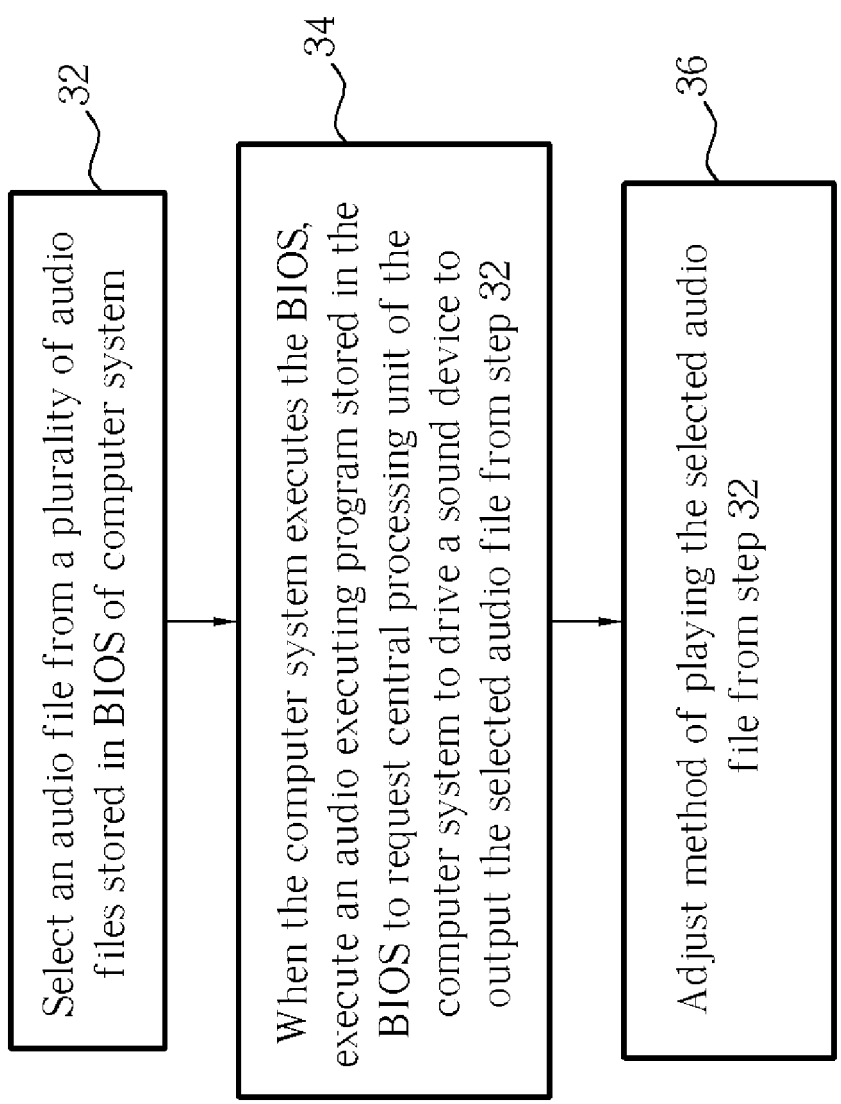
FIG. 3 illustrates a flowchart of a method of playing audio files when booting a computer system.

Please refer to FIG. 3. FIG. 3 illustrates a flowchart of a method of playing audio files when booting the computer system, also an executing method flowchart of the control interface shown in FIG. 2 that is able to play audio file during the boot sequence, and to select an audio file and a method of adjusting playing of audio file.

Step 32: the computer selects an audio file from a plurality of audio files stored in BIOS of computer system;

Step 34: the computer system executes an audio executing program stored in the BIOS to request central processing unit of the computer system to drive a sound device to output the selected audio file from step 32 when the computer system executes the BIOS; and Step 36: the control interface adjusts method of playing the audio file.

In conclusion, the embodiment of the present invention relates to a computer system and related method of playing audio files when booting. The computer system utilizes a specialized audio circuit, for example, a DSP or an ASIC, to execute the audio file prior to the completion of initialization of other hardware. Under the existing hardware in a computer system, an audio executing program, stored in BIOS, is utilized to control central processing unit when the boot sequence executes the BIOS such that an audio file is played during the boot sequence. The embodiment of the present invention provides a computer system capable of playing audio files when booting which can be realized by utilizing the hardware and by executing the software to successfully overcome silence during booting, and to provide more selection and enjoyment for the user during booting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system capable of playing an audio file when booting, the computer system comprising:
   an audio circuit for playing an audio file when the computer system is booting;
   a basic input and output system (BIOS) for storing a plurality of audio files; and
   a control interface for receiving commands inputted by a user during a boot sequence for selecting an audio file and to further adjust the method of playing the audio file.

2. The computer system of claim 1 wherein the audio file comprises at least a music file.

3. The computer system of claim 1 wherein the audio circuit is a digital signal processor (DSP) or an application specific integrated circuit (ASIC).

4. A computer system comprising:
   a sound device;
   a central processing unit (CPU) coupled to the sound device;
   a basic input and output system (BIOS), coupled to the central processing unit, for storing an audio executing program and a plurality of audio files, when the computer system is booting, the audio executing program requests the central processing unit to drive the sound device to play the audio file; and
   a control interface for receiving commands inputted by a user during a boot sequence for selecting an audio file and to further adjust the method of playing audio file.

5. The computer system of claim 4 wherein the audio file comprises at least a music file.

6. A method of playing an audio file when booting the computer system, the method comprising:
   executing an audio executing program;
   driving a sound device by a central processing unit according to the audio executing program;
   playing an audio file out of a plurality of audio files stored in a basic input and output system (BIOS) using the sound device; and
   receiving commands from a user during a boot sequence for selecting an audio file from the plurality of audio files.

7. The method of claim 6 further comprising adjusting volume of playing the audio file.

* * * * *